United States Patent
Aso et al.

[11] Patent Number: 6,002,658
[45] Date of Patent: *Dec. 14, 1999

[54] DISC DRIVE

[75] Inventors: Hiroshi Aso, Kanagawa; Kouichi Kuroiwa, Tochigi; Seiji Nakayama; Mitsunori Nakamura, both of Kanagawa; Shuichi Tooi, Tochigi, all of Japan

[73] Assignee: Mitsumi Electric Co. Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/879,836

[22] Filed: Jun. 20, 1997

[30] Foreign Application Priority Data

Jun. 20, 1996 [JP] Japan ..................................... 8-180048
Jul. 2, 1996 [JP] Japan ..................................... 8-191549

[51] Int. Cl.⁶ .................................................. G11B 33/02
[52] U.S. Cl. .......................................................... 369/75.1
[58] Field of Search .......................... 360/137; 369/75.1, 369/75.2, 77.1, 263; 361/685; 364/578, 708.1

[56] References Cited

U.S. PATENT DOCUMENTS

| | | | |
|---|---|---|---|
| 4,812,932 | 3/1989 | Hishinuma et al. | 360/97.01 |
| 4,893,210 | 1/1990 | Mintzlaff | 360/137 |
| 5,062,099 | 10/1991 | Odawara et al. | 369/263 |
| 5,166,918 | 11/1992 | Kamijo | 369/77.1 |
| 5,311,455 | 5/1994 | Ho | 364/708.1 |
| 5,359,587 | 10/1994 | Uehara | 369/75.1 |
| 5,400,196 | 3/1995 | Moser et al. | 360/97.02 |
| 5,491,608 | 2/1996 | Koyanagi et al. | 361/685 |
| 5,608,705 | 3/1997 | Tanaka | 369/77.1 |
| 5,625,575 | 4/1997 | Goyal et al. | 364/578 |
| 5,691,969 | 11/1997 | Fujisawa | 369/77.1 |
| 5,745,471 | 4/1998 | Son et al. | 369/263 |

FOREIGN PATENT DOCUMENTS

| | | |
|---|---|---|
| 0 328 260 A2 | 8/1989 | European Pat. Off. . |
| 0 442 641 A2 | 8/1991 | European Pat. Off. . |
| 0 583 946 A1 | 8/1993 | European Pat. Off. . |
| 5-69414 | 7/1995 | Japan . |

OTHER PUBLICATIONS

Japanese Patent Abstract No. 58035701, Mar. 2, 1983.
Japanese Patent Abstract No. 05054621, Mar. 5, 1993.
Japanese Patent Abstract No. 05342830, Dec. 24, 1993.
Japanese Patent Abstract No. 08021486, Jan. 21, 1996.
08021486 Patent Abstracts of Japan, Jan. 23, 1996.

*Primary Examiner*—David L. Ometz
*Assistant Examiner*—Angel Castro

[57] ABSTRACT

A disc drive is constructed from a main body which includes a mechanism unit having a disc rotating mechanism for rotating a disc and a play back mechanism for playing back information recorded on the disc, disc tray movably provided with respect to the main body for supporting a disc and a casing for housing the main body. The disc drive is provided with vibration absorbing members for suppressing transmission of vibration caused by high speed rotation of the disc from the main body to the casing. The vibration absorbing members are formed of elastical members and they are arranged between the side portions of the main body and the inside of the casing, thereby the main body is supported by the casing through the vibration absorbing members to prevent vibrations caused in the main body from being transmitted to the casing. Further, the casing has a U-shaped side plate and a top plate fixed to the side plate by screws, in which the top plate is in point contact with the side plate through a plurality of protrusions formed on upper edges of the side plate. This point contact between the top plate and the side plate makes it possible to prevent rattling from being caused by the transmitted vibrations, thereby preventing generation of noise.

15 Claims, 9 Drawing Sheets

DISC DRIVE

BACKGROUND OF THE INVENTION

1. Field of the Invention

The present invention relates to a disc drive for playing back or recording and playing back an optical disc.

2. Description of the Prior Art

One example of a disc drive for playing back an optical disc such as a CD-ROM or the like is disclosed in Japanese Utility Model Application No. HEI-5-69414. FIG. 1 is an exploded perspective view of the structure of the disc drive disclosed in the Utility Model application.

As shown in this drawing, a disc drive 1B is constructed from a main body 2B, a disc tray 4 which moves backwards and forwards with respect to the main body 2B to enable the disc tray 4 to be insertable into and ejectable out of the main body 2B, a circuit substrate assembly 12B arranged at a lower portion of the main body 2B, and a casing 10B which houses all these elements.

The casing 10B is constructed from a bottom plate 11 and a case 14 which covers the top of the main body 2B. The bottom plate 11 and the case 14 are made from metal plates which have undergone cutting and bending processes to form a desired shape.

The case 14 is constructed from a top plate 14a, side walls 14b, 14c which face each other through the main body 2B, a rear wall 14d which connects the rear vertical edges of the side walls 14b, 14c, and a front plate portion 14e at the front thereof.

Provided on the bottom surface (inside surface) of the top plate 14a is a disc clamper 38 which is adapted to rotate about the same axis as that of a turntable 26 (described below).

Formed in the front plate 14e of the case 14 is an aperture 14 which allows the disc tray 4 to be passed therethrough. A front panel 16 having an aperture 16a which is mated with the aperture 141 is mounted on the front plate 14e via a cushioning member frame 15.

The main body 2B includes a roughly container-shaped chassis 20 which is provided with a mechanism unit 22 and a displacement mechanism (ascending/descending mechanism) 30. The mechanism unit 22 is arranged within a concave portion formed in the bottom portion 20a of the chassis 20, and the displacement mechanism 30 is arranged in the front side thereof.

The main body 2 is fixed to the bottom plate 11 and the case 14 by means of screws 17.

The mechanism unit 22 includes a base 23 which is provided with a spindle motor 25, a turntable 26 which is provided on a rotation axle of the spindle motor 25, an optical head 27, and an optical head moving mechanism 28.

Further, a rear end portion (toward the back of the main body 2) of the base 23 is supported by an insulator 29 to enable the base 23 to be freely pivotal with respect to the chassis 20.

The displacement mechanism 30 is constructed from a motor 31 provided at a front portion of the chassis 20, a rotational speed reduction mechanism 32 for reducing the rotational speed of the motor 31, a cam wheel (ascending/descending gear member) 33 which is rotated by the rotational speed reduction mechanism 32, and a base ascending/descending member (not shown in the drawing) which is adapted to be displaced (rotated) in accordance with the rotation of the cam wheel 33.

The cam wheel 33 includes a lower gear 33a which meshes with a pinion gear of the rotational speed reduction mechanism 32, and an upper gear 33b which meshes with a rack gear (not shown in the drawing) formed on the bottom surface of the disc tray 4 in the forward and backward direction thereof. Further, a circumferential cam groove is formed in the outer circumference of the axle portion between the gears 33a and 33b. This cam groove is slidably engaged with a protruding follower (not shown in the drawing) formed on the base ascending/descending member. Consequently, as the cam wheel is rotated, the follower and the base ascending/descending member are displaced, and this causes the base 23 to pivot; namely, the front portion of the base 23 is moved up or down.

The disc tray 4 includes a shallow concave disc supporting portion 4a for supporting an optical disc 3. On the bottom surface of the disc tray 4, there is is formed a rack gear (not shown in the drawing) which meshes with the upper gear 33b of the cam wheel 33. Consequently, as the cam wheel 33 is rotated, the disk tray 4 is moved forward or backward with respect to the chassis 20 between a disc unloading position (outside position) and a disc loaded position (inside position).

When the disc drive 1B is not in use, the disc tray 4 is housed within the casing 10B (at the disk loaded position). In this state, if an eject operation is carried out, the motor 31 is rotated in a prescribed direction, whereby the cam wheel 33 is rotated in a prescribed direction via the rotational speed reduction mechanism 32. This rotation of the cam wheel 33 causes the disc tray 4 to move forward so that the disc tray 4 protrudes to a position (the disc unloading position) outside the casing 10B through the apertures 141, 16a.

In this state, a disc 3 is loaded or put into the disc supporting portion 4a of the disc tray 4, and a loading operation is carried out, whereby the motor 31 is rotated in the opposite direction. This causes the cam wheel 33 to rotate in the opposite direction via the rotational speed reduction mechanism 32. Consequently, the disc tray 4 is moved backwardly, through the apertures 141, 16a, to the disc loaded position. In this way, the loaded optical disc 3 which is placed at a prescribed position on the disc tray 4, that is placed in the disc supporting portion of the disc tray 4 is also transported to the disc loaded position of the main body 2B.

Further, when the cam wheel 33 begins to rotate in the opposite direction, the follower of the base ascending/descending member moves along the cam groove. When the center of the disc 3 supported on the disc tray 4 approaches the central portion of the turntable 26 according to the rotation of the cam wheel 33, the follower and the base ascending/descending member are displaced by the cam wheel 33 so that the front portion of the base 23 pivots about the position of the insulator 29 to displace the front portion of the base 23 from a lower position (descending position) to an upper position (ascending position), whereby the base 23 is placed in a roughly horizontal state.

In this way, the center portion (center hub portion) of the turntable 26 is fitted into a center hole 3a of the optical disc 3. When the center portion of the optical disc is supported on the turntable 26 in this way, the disc damper 38 is magnetically stuck to the turntable 26, thereby the optical disc 3 being held between the turntable 26 and the disc clamp 38. In this state, the spindle motor 25 is operated to rotate the optical disc 3 at a predetermined rotational speed, and then the information recorded on the optical disc 3 is played back using the optical head 27.

If an eject operation is carried out while the rotation of the optical disc 3 is stopped, the order and direction of the operations of each mechanism of the disc drive 1B are carried out in reverse, so that the clamp of the disc 3 is released and then the optical disc 3 placed on the disc tray 4 is ejected.

In recent years, in the field of the disc drives like the disc drive 1B described above, developments are made in order to increase a rotational speed of an optical disc. As a result, disc drives which can rotate an optical disc 3 at high speeds, such as 8 times speed, 12 times speed and the like are developed, but this in turn arises the following problems.

The allowable dimensional error range of the optical disc 3 is determined according to a standard, however such standard was prepared based on the basic rotational speed of the optical disc 3, that is 1 times speed. For this reason, when such an optical disc 3 is driven at a high speed (i.e., a speed which exceeds 1 times speed), vibration is likely to occur due to eccentric rotation caused by the dimensional deviation of the disc and the unbalanced distribution of mass of the optical disc 3 which lie in the range allowed by the standard. Further, more severe vibration will occur in the case where the optical disc 3 was not manufactured according to the standard (i.e., an inferior product).

Further, this type of vibration will also occur if the axes of the optical disc 3 and the turntable 26 are misaligned (i.e., eccentrical).

Unfortunately, an effective countermeasure for suppressing such vibration has not been adopted in such a prior art disc drive 1B described above. In particular, because the main body 2B is fixed to the metal bottom plate 11 and the metal case 14 by means of the screws 17, as described above, vibrations caused by eccentric rotation of the optical disc 3 or the like are easily transmitted from the main body 2B to the metal casing 10B, which causes the casing 10B to resonate and thereby generate noise.

Also, in the case where the disc drive is installed in a personal computer, such vibrations are also transmitted to the personal computer body, thereby creating unfavorable effects to the personal computer. Further, in the other direction, vibrations from the personal computer are also transmitted to the disc drive.

In order to prevent such vibration and noise from being generated, it may be possible to adopt a structure in which a plurality of coil springs are arranged between the lower plate 11 and the main body 2B so that the main body 2B are supported by such coil springs to absorb vibrations, but this in turn creates the following problems.

Namely, although the above-described structure is suited for absorbing vibration in the vertical direction (i.e., the rotational axial direction of the optical disc), most of the vibrations which are generated in the main body 2 occur in the horizontal direction (i.e., the radial direction of the optical disc) because they are caused by the eccentric rotation of the optical disc 3. Therefore, it is not possible to obtain a sufficient vibration absorbing (damping) and noise preventing effects (damping effect). Also, such damping effect is affected by the posture of the disc drive, namely affected by the posture of the PC equipped with the disc drive whether it is placed horizontally or vertically.

Further, because the coil springs in the above structure are provided in the lower portion of the main body 2B, it is not possible to make effective use of the space of such portion.

Furthermore, because the vibration absorbing coil springs need to be fixed from the rear side of the bottom plate 11 with screws, number of parts are increased.

In addition, as stated in the above, the vibration described above is transmitted from the main body 2B to the metal casing 10B (bottom plate 11 and case 14), thereby causing the casing 10B to resonate and generate noise. Such noise is generated due to the reason stated below.

Namely, in the construction of the prior art disc drive, the lower edges of the side walls 14b, 14c and the rear wall 14d of the case 14 are in abutment with the inner surface of the bottom plate 11 directly. However, the lower edges of the side walls 14b, 14c and the rear wall 14d of the case 14 have lower linear precision, since they are formed by carrying out a shearing process on a metal plate using a press machine or the like and no later shape correction such as a precision process or the like is carried out. Therefore, there are many irregularities on the edges and the linear precision of the edges is bad. For this reason, when the case 14 and the bottom plate 11 are assembled, even when these elements are tightly fixed using screw fasteners, the connection between the bottom plate 11 and each lower edge of the side walls 14b, 14c and rear wall 14d is unstable.

In such an unstable connected state, when vibration is transmitted to the casing 10B as described above due to high speed rotation, a rattling is created between the case 14 and the bottom plate 11, thus generating an even greater amount of noise.

SUMMARY OF THE INVENTION

In view of the problems described above, it is an object of the present invention to provide a disc drive which can suppress/prevent vibrations and noise due to eccentric disc rotation or the like.

In order to achieve the object state above, the disk drive according to the present invention comprises a main body including a mechanism unit having a disc rotational driving means for rotating a disc and at least a play back means for playing back information recorded on a disc, the main body having side portions; a disc supporting means provided with respect to the main body for supporting a disc; a casing having an inside for enclosing the main body; and vibration absorbing means arranged between the side portion of the main body and the inside of the casing to prevent vibrations caused by the rotation of the disc from being transmitted from the main body to the casing.

With this structure, it is possible to suppress vibrations caused by the rotation of the disc from being transmitted from the main body to the casing. Further, it is also possible to suppress any noise which would be created by such vibration. Further, such structure is also effective at suppressing the transmission of vibrations from the casing to the outside of the disc drive. Consequently, the present invention is suited for disc drives in which a disc is rotated with high speed and therefore vibrations and noise are likely to be generated.

In this connection, in the disc drive of the present invention, it is preferred that the main body is supported on the inside of the casing by means of vibration absorbing members.

Further, it is also preferred that the casing is constructed from a top plate, a bottom plate and a side plate arranged between the top plate and the bottom plate, in which the side portions of the main body are supported by the side plate by means of the vibration absorbing members.

In this structure, by positioning the vibration absorbing members on the side portion of the main body, it is possible to make effective use of the space above and below the main body, and this structure avoids a large increase in the number of parts in comparison with the prior art. Further, this structure makes it possible to attach and remove the vibration absorbing members easily, and this makes it easy to assemble the disc drive.

In particular, by arranging the vibration absorbing members on the side portion of the main body, it is possible to achieve a very effective absorption and suppression of vibrations in the radial direction of the disc due to eccentric rotation of the disc. Further, such excellent vibration damping or absorbing effect can be achieved regardless of whether the disc drive is placed horizontally or vertically.

Further, it is preferred that the main body is supported by the inside of the casing at two points in each of the side portions by means of the vibration absorbing members.

Further, it is preferred that the main body only make contact with the casing via the vibration absorbing members.

Further, the vibration absorbing members are preferably made from an elastic material. In this case, it is preferred that the vibration absorbing members also include a hollow axial space.

Further, it is also preferred that the vibration-absorbing members are expandable or contractible in the direction in which vibrations are generated due to eccentric rotation of the disc and/or deformable in the direction of vibration generated in the axial direction of the rotating disc.

Furthermore, it is also preferred that each of the vibration absorbing members includes a first engaging portion to be engaged with the main body, a second engaging portion to be engaged with the casing and an elastic deformable portion which are arranged between the first and the second engaging portions.

Further, in the disc drive of the present invention, the casing can be constructed from a first member which includes side walls, and a plate shaped second member which is joined and fixed to the first member, in which a plurality of protrusions are formed on edges of the side walls of the first member to which the second member is abutted in such a manner that the second member is joined to the first member through point-contact by the protrusions.

In this way, by providing a plurality of protrusions on the first member, a point contact is established between the first and second members, and this creates a stable connection between the first and second members. As a result, even if some of the vibration due to eccentric rotation of an optical disc is transmitted through the vibration absorbing members to the casing, such stable connection suppresses the generation of rattling and noise in the casing.

In this case, it is preferred that the first member includes first and second side walls which face each other at the opposite sides of the main body, and a third side wall which connects the first and second side walls at one end thereof, in which at least one or two protrusions are formed on the edge of each of the first, second and third side walls.

Further, it is also preferred that the first member includes mounting portions provided between the protrusions formed on the first side wall and between the protrusions formed on the second side wall to enable the first member to be mounted to the second member by means of screw fasteners or the like.

Further, it is preferred that the protrusions be integrally formed on the upper edge of the plate-shaped member which forms the side walls, with the protrusions being formed with rounded tip ends. Further, it is preferred that the first and second members are manufactured from metal plates, and it is further preferred that the first member is a side plate and the second member is a top plate or bottom plate.

Other objects, structures and advantages of the present invention will be apparent when the following description of the preferred embodiments are considered taken in conjunction with the accompanying drawings.

DETAILED DESCRIPTION OF THE PREFERRED EMBODIMENTS

With reference to the appended drawings, a detailed description of the preferred embodiments of a disc drive according to the present invention will now be described.

Figure 1:
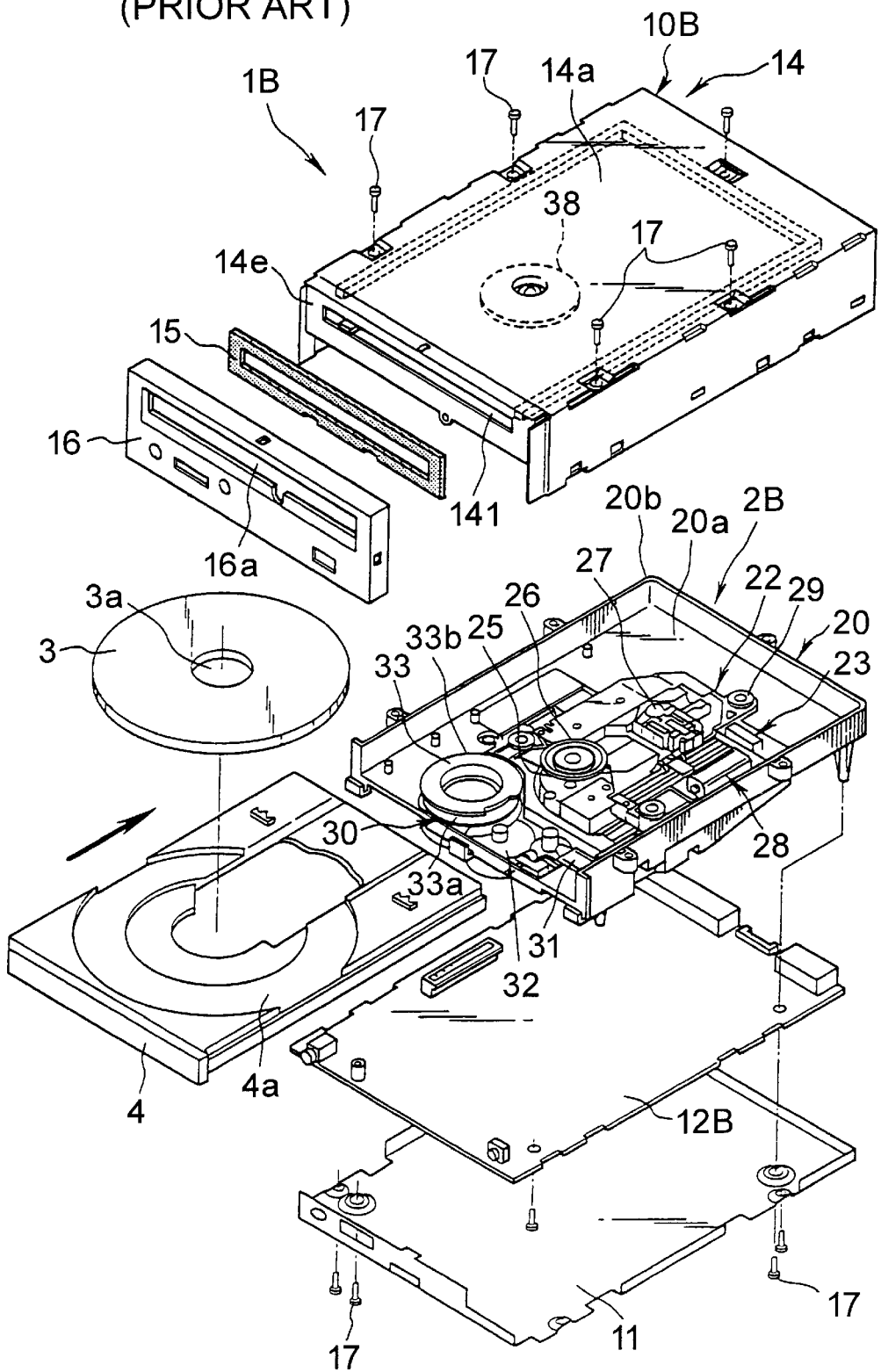
FIG. 1 is an exploded perspective view showing the structure of the prior art disc drive.
Figure 2:
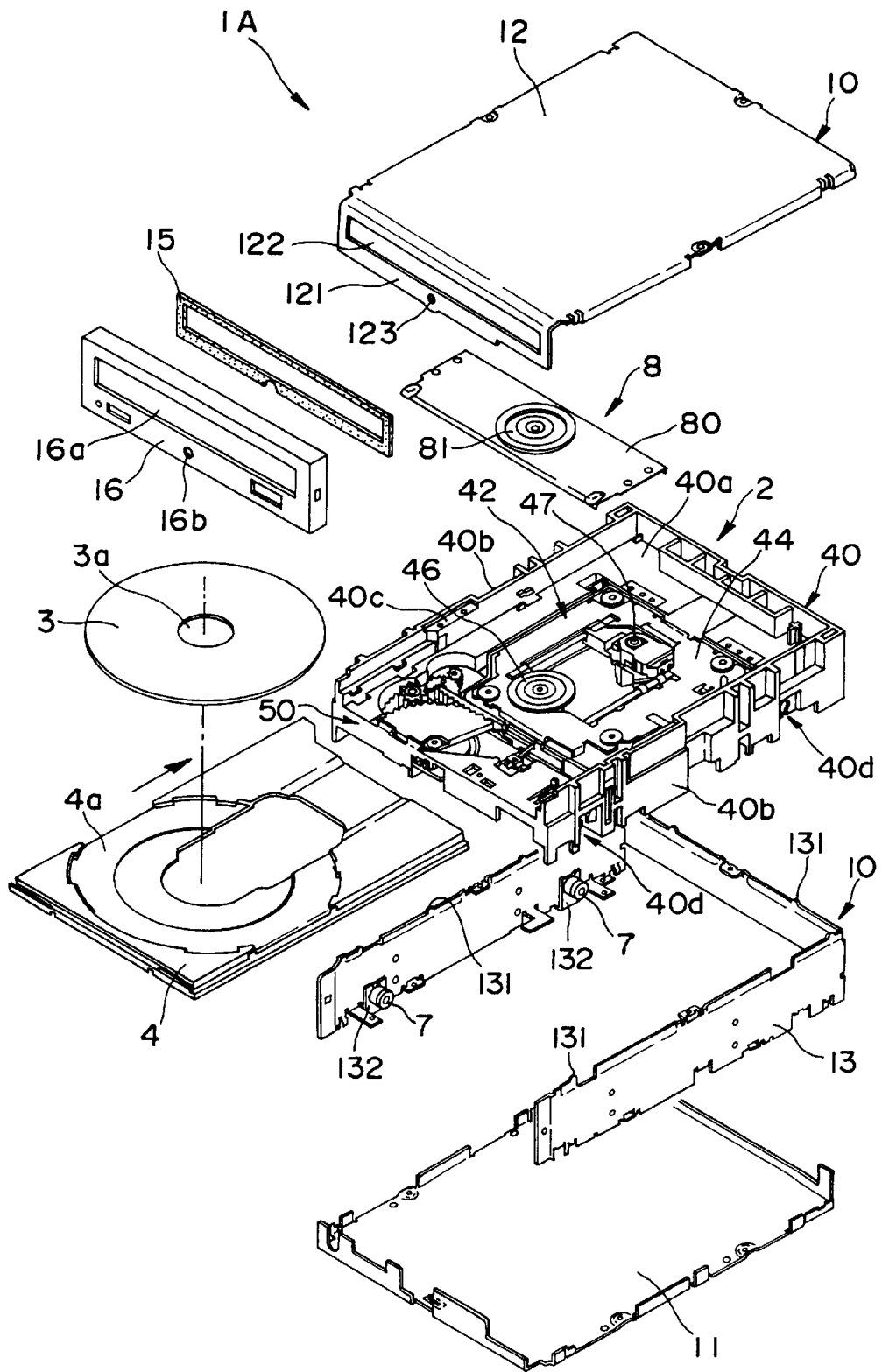
FIG. 2 is an exploded perspective view of an embodiment of a disc drive according to the present invention.
Figure 3:
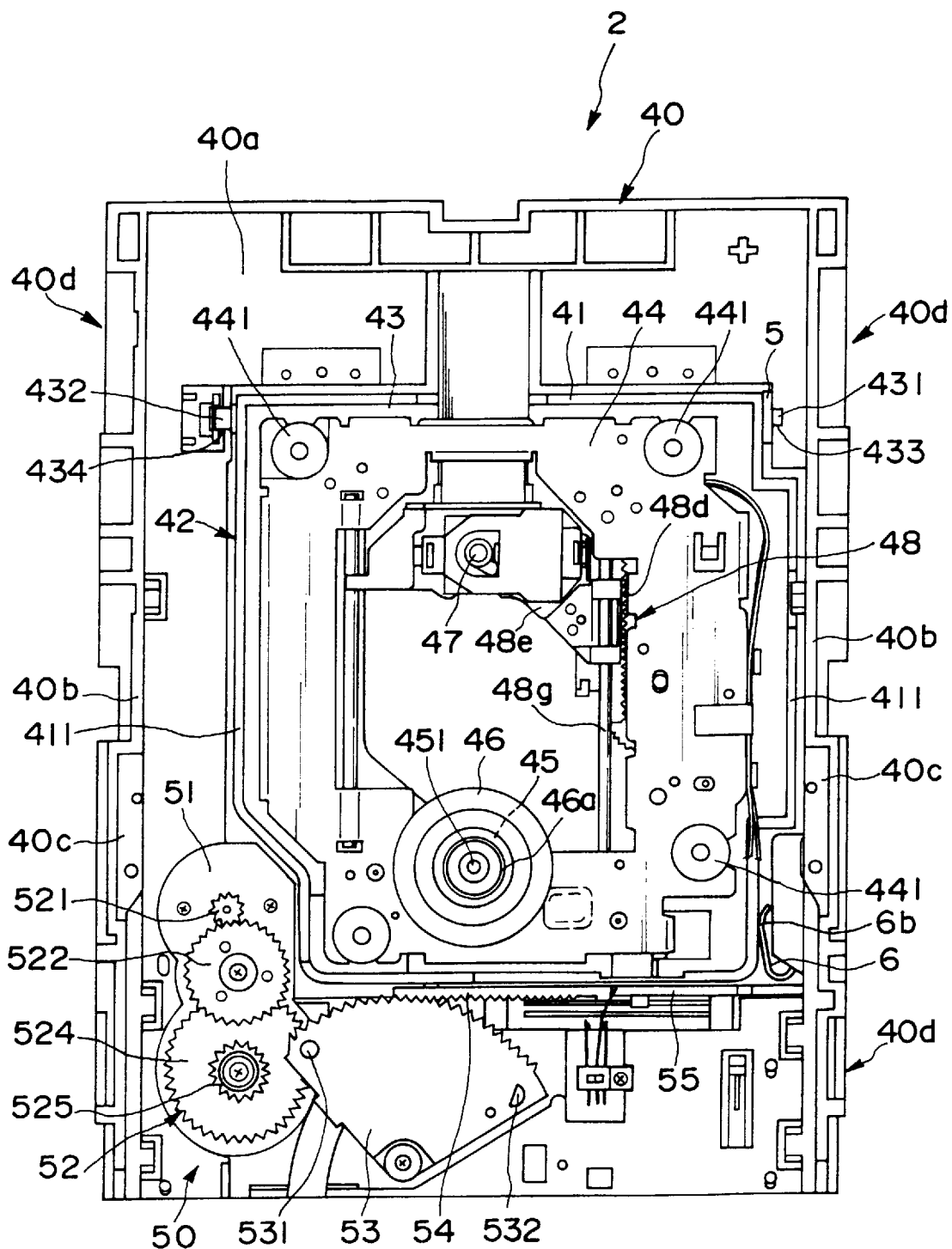
FIG. 3 is a planar view of a main body of the disc drive shown in FIG. 2.
Figure 4:
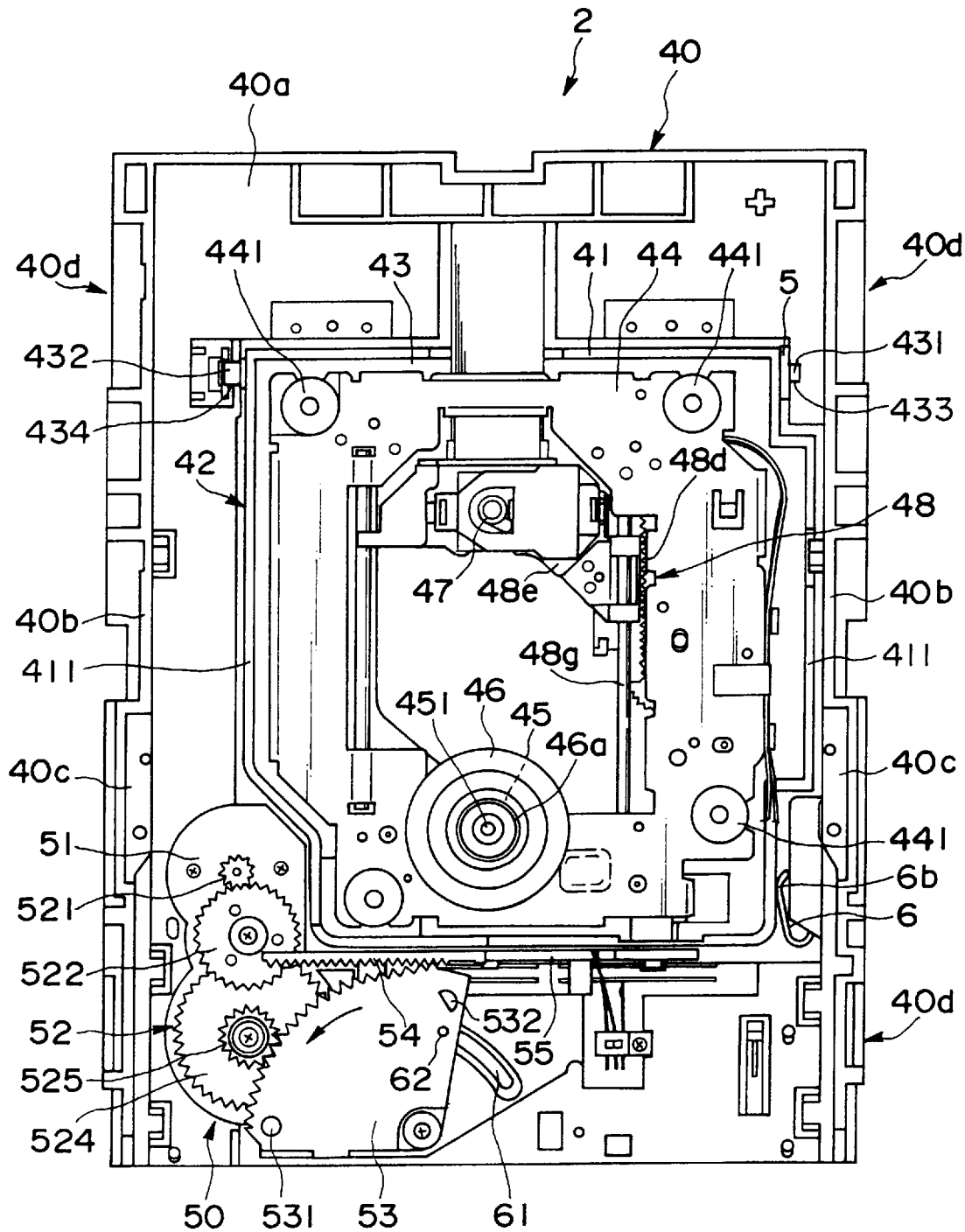
FIG. 4 is another planar view of the main body of the disc drive shown in FIG. 2.
Figure 5:
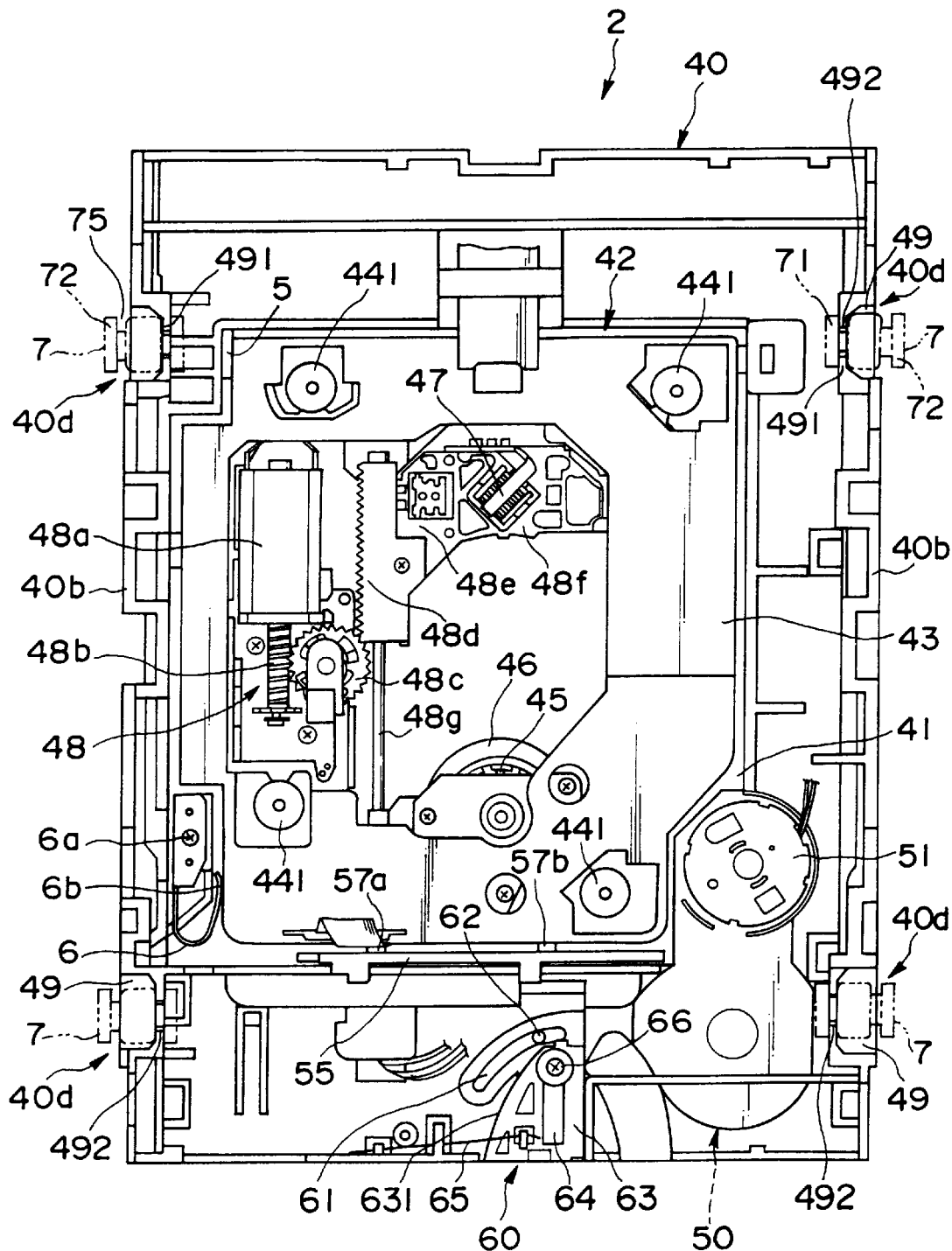
FIG. 5 is a bottom view of the main body of the disc drive shown in FIG. 2.
Figure 6:
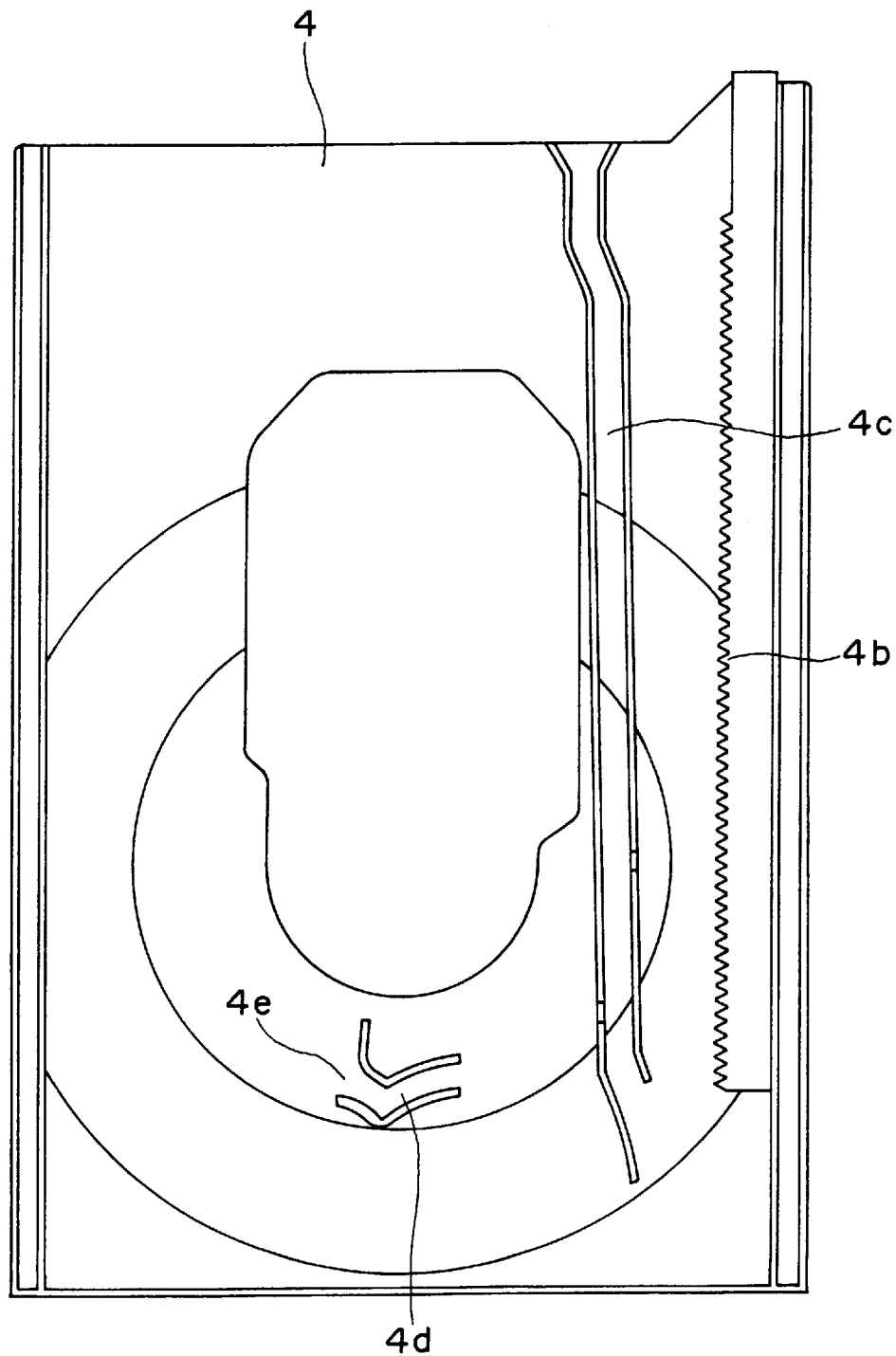
FIG. 6 is a bottom view showing the structure of the rear surface of a disc tray in the disc drive shown in FIG. 2.
Figure 7:
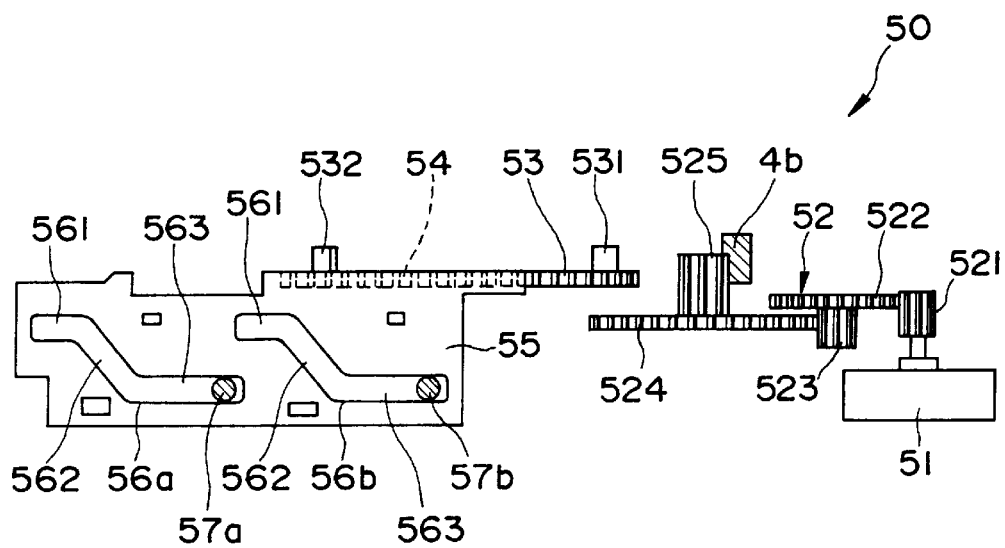
FIG. 7 is a rear view showing the structure of a displacement mechanism in the disc drive shown in FIG. 2.
Figure 8:
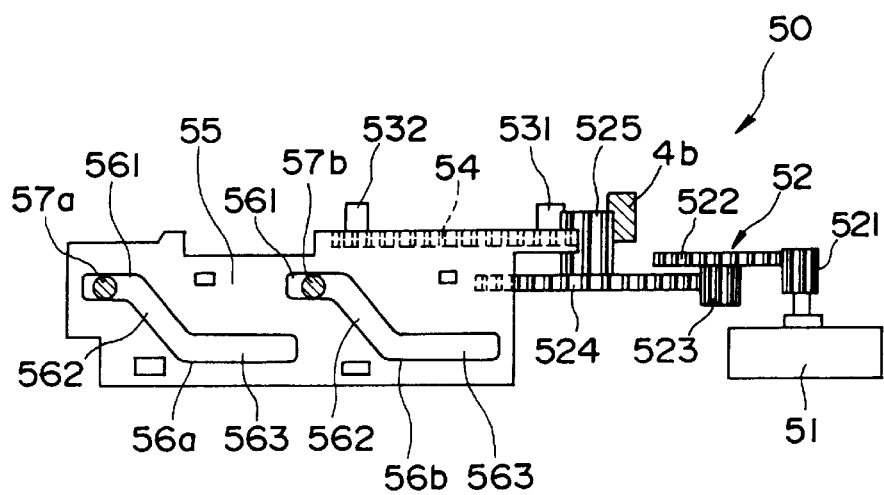
FIG. 8 is another rear view showing the structure of the displacement mechanism in the disc drive shown in FIG. 2.
Figure 9:
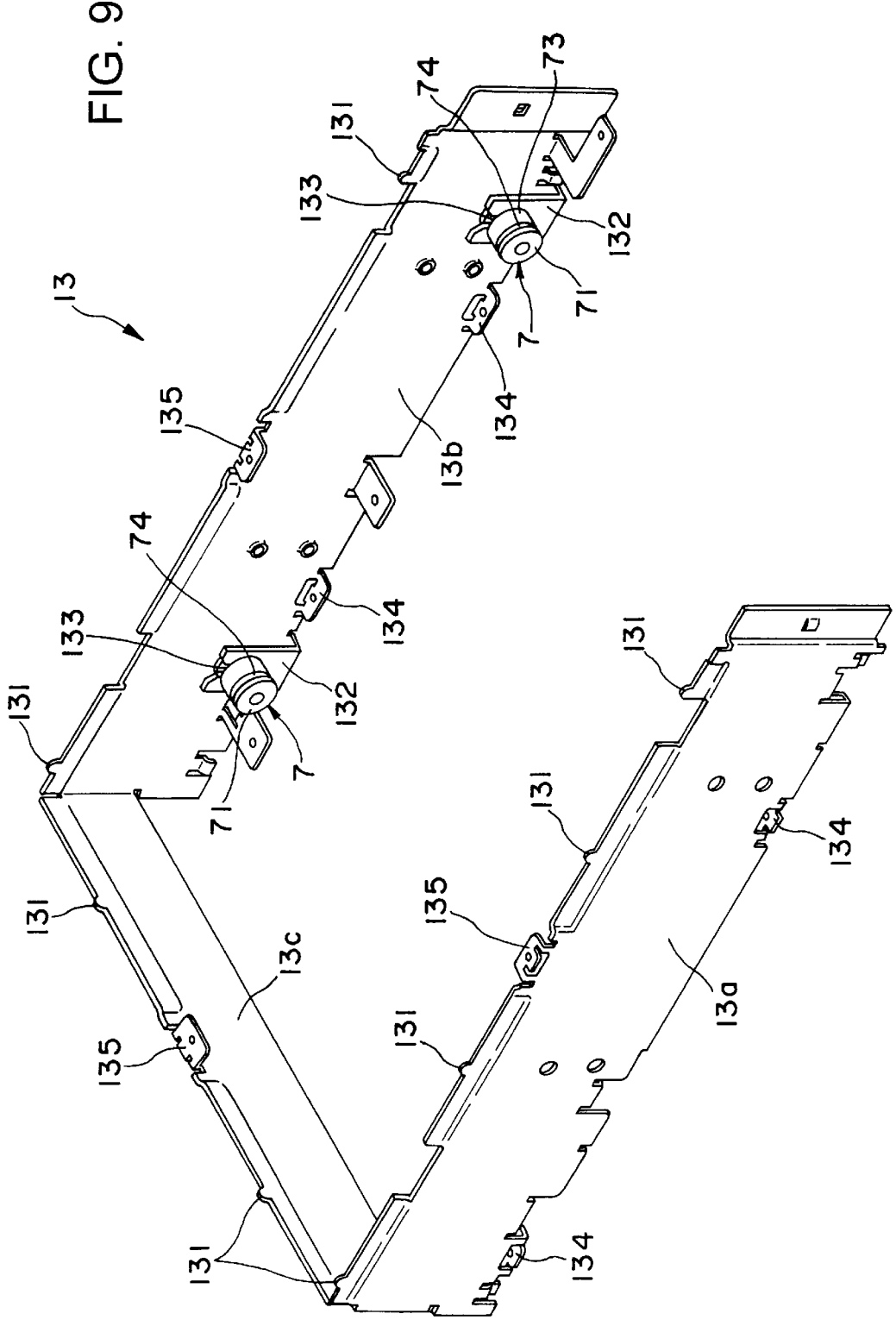
FIG. 9 is a perspective view of a side plate which form a casing.
Figure 10:
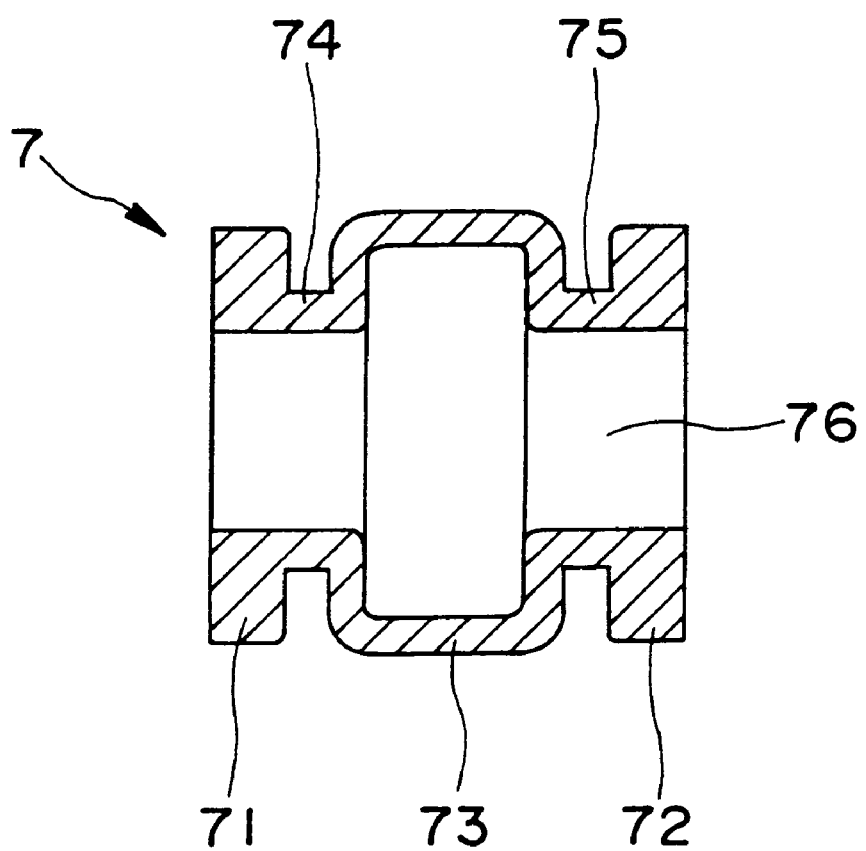
FIG. 10 is a vertical cross-sectional view showing an example structure of a vibration-absorbing member.

FIG. 2 is an exploded perspective view of an embodiment of disc drive according to the present invention; FIG. 3 and FIG. 4 are planar views of a main body of the disc drive shown in FIG. 2; FIG. 5 is a bottom view of the main body of the disc drive shown in FIG. 2; FIG. 6 is a bottom view showing the structure of the rear surface of a disc tray in the disc drive shown in FIG. 2; FIG. 7 and FIG. 8 are rear views showing the structure of a displacement mechanism in the disc drive shown in FIG. 2; FIG. 9 is a perspective view of side plates which form a casing; and FIG. 10 is a vertical cross-sectional view showing an example structure of a vibration-absorbing member.

As shown in FIG. 2, a disc drive 1A of the present invention is an apparatus for at least playing back an optical disc 3, such as a CD-ROM, audio CD or the like. The disc drive is roughly constructed from a main body 2, a disc tray 4 for transporting an optical disc 3, in which the disc tray 4 is adapted to move forwards and backwards (horizontally) with respect to the main body 2 so as to be insertable into and ejectable out of the main body 2, a circuit substrate assembly (not shown in the drawing) which is arranged at a lower portion of the main body 2, and a casing 10 which houses all these elements.

The main body 2 includes a roughly container-shaped chassis 40. The chassis 40 is constructed from a roughly plate-shaped rectangular bottom portion 40*a*, and a U-shaped wall portions 40*b* which are erected from the left, right and rear edge portions of the bottom portion 40*a*, respectively. No wall portion is formed at the front side of the chassis 40. Therefore, this area is left in an open state such that when the chassis 40 is arranged inside the casing 10, an aperture 122 formed in a front plate 121 of a top plate 12 is positioned at such area.

Further, formed on an upper portion of each of the left and right side wall portions of the chassis 40 is an attaching portion 40c to which a disc damper supporting member 80 (described below) is to be attached. Further, formed on side surfaces of the left and right side wall portions are mounting portions 40d, 40d to which vibration absorbing members 7, 7 (described below) are to be mounted.

Provided on the chassis 40 are a mechanism unit 42 and a displacement mechanism (ascending/descending mechanism) 50 for displacing the mechanism unit. The mechanism unit 42 is arranged around the central of a space (aperture) 41 formed in the bottom portion 40a of the chassis 40, while the displacement mechanism 50 is arranged at the front side of the space 41.

As shown in FIG. 3 and FIG. 4, the mechanism unit 42 includes a base 43 and a metal plate 44 fixed to the base 43 via four insulators 441 made of elastic material.

Further, the mechanism unit 42 includes a spindle motor 45, a turntable 46 fixed to a rotation axle 451 of the spindle motor 45, an optical head (optical pick-up) 47 including an actuator and a lens, and an optical head moving mechanism 48 for moving the optical head in the radial direction of the optical disc 3. The spindle motor 45 and the optical head moving mechanism 48 are mounted on the metal base plate 44.

The spindle motor 45 is an electrical motor capable of high rotation; for example, it is capable of rotating the optical disc 3 at a rotational speed of 200–6400 rpm.

The turntable 46 is a disc-shaped member which houses a ring-shaped permanent magnet to create a holding force (i.e., a magnetic attracting force) on a disc damper 8 (described below). The central portion of the turntable 46 is formed into a ring-shaped protruding central hub portion 46a, such that when the disc damper 8 is being attracted, the central hub portion 46a fits into a fitting groove (not shown in the drawings) formed in a bottom portion of the disc damper 8 (described below), thereby aligning the axes of the turntable 46 and the disc damper 8.

The turntable 46 and the spindle motor 45 which rotates the turntable 46 constitute a disc rotating means for rotating the optical disc 3.

The optical head 47 is a flat type optical head constructed so as to deflect light reflected from the optical disc 3 by roughly 90 degrees using a mirror (or prism) or the like in order to guide such light to a light gathering element such a photodiode or the like.

As shown in FIG. 5, the optical head moving mechanism 48 is constructed from a motor 48a which is capable of forward rotation and reverse rotation, a rotatable worm 48b which is driven by the motor 48a, a worm wheel 48c which meshes with the worm 48b, a small gear (not shown in the drawings) which is fixed to the same axis as the worm wheel 48c, a rack gear 48d which meshes with the small gear, a slider 48e to which the rack gear 48d is fixed, a guide rod 48g for guiding the movement of the slider 48e, and a mounting base 48f integrally formed with the slider 48e for mounting the optical head 47. The worm 48b and the guide rod 48g are arranged in such a manner that their lengthwise direction are aligned with the forward and backward direction of the disc drive 1A.

In this kind of optical head moving mechanism 48, when the motor 48a is driven to rotate the worm 48b in a prescribed direction, this rotation is transmitted via each of the gears to cause the slider 48e to move along the guide rod 48g in the forward and backward direction of the disc drive 1A, whereby the optical head 47 fixed to the mounting base 48f is also moved in the radial direction of the optical disc 3 placed on the disc tray 4. The optical head 47 and the optical head moving mechanism 48 constitute a playback means in this invention.

Further, the driving operations of the spindle motor 45, the motor 48a and a motor 51 (described below) are controlled by a control means (CPU) provided in a circuit substrate assembly (not shown in the drawings). In this connection, the circuit substrate assembly may be fixed to the main body 2 or it may be attached to either the side plate 13 or the bottom plate 11 at a prescribed spacing from the lower surface of the main body 2.

Protruding axles 431, 432 are formed on the side portions of the rear portion of the base 43 (the rear portion means the back of the main body 2). The mechanism unit 42 is supported by these axles 431, 432 for pivotal movement with respect to the chassis 40.

The axle 431 is provided with a ring-shaped vibration absorbing member (rubber washer) 5 for absorbing vibrations generated in the axial direction. This vibration absorbing member 5 can be made from various rubbers, soft resins (thermoplastic elastomers) and the like. In this case, in order for the mechanism unit 42 to rotate smoothly with respect to the chassis 40, it is preferred that the vibration absorbing member 5 be constructed from a material having a relatively low coefficient of friction.

As a result, even if vibration occurs in the mechanism unit 42 due to eccentric rotation of the optical disc 3 or the like, such vibration will be absorbed by the vibration absorbing member 5, thereby blocking or suppressing the transmission of such vibration to the chassis 40. Accordingly, this makes it possible to prevent the mechanism unit from rattling with respect to the chassis 40.

Further, it is also possible to provide a vibration-damping member 5 on both the axle 431 and the axle 432.

Further, a biasing member 6 comprised of a plate spring is provided on the chassis 40 at the side of the axle 431 (i.e., at the side where the vibration-damping member 5 is provided) and the front side of the base 43 (that is the front side of the main body 2) so as to abut on the front side of the base 43 to bias it toward the side where the axle 432 is located. This biasing member 6 is fixed to the chassis 40 by means of a screw 6a. Thus, by biasing the front portion of the base 43 (the mechanism unit 42) to the side (to one side), the biasing member 6 makes it possible to prevent rattling of the front portion of the mechanism unit 42.

In this connection, the pushing force of the biasing member 6 on the side surface of the base 43 is set so as to be sufficient at preventing rattling of the front portion of the mechanism unit 42 without hindering the pivotal motion of the mechanism unit 42.

The displacement mechanism 50 is constructed from a motor 51 capable of forward and reverse rotation provided in the front portion of the chassis 40, a rotational speed reduction mechanism 52 for transmitting rotation of the motor 52 with its speed being reduced, a sector-shaped gear 53 which is rotated within a prescribed angular range by means of the rotational speed reduction mechanism 52, and a cam member 55 equipped with a rack gear 54 which meshes with the sector-shaped gear 53.

Specifically, as shown in FIG. 7 and FIG. 8, the rotational speed reduction mechanism 52 is constructed from a small gear 521 fixed to the end of the rotational axle of the motor 51, a large gear 522 which meshes with the small gear 521, a small gear 523 fixed to the same axle below the large gear 522, a large gear 524 which meshes with the small gear 523, and a small gear 525 fixed to the same axle above the large gear 524. Any of these gears 521–525 may be constructed from a flat gear.

The small gear 525 meshes with the sector-shaped gear 53 and a rack gear 4b (described below) formed in the rear surface of the disc tray 4. The rotation of the motor 51 is reduced by the rotational speed reduction mechanism 52 according to a prescribed reduction ratio, and then the rotation of which rotational speed being reduced is transmitted to the sector-shaped gear 53 and the rack gear 4b.

The cam member 55 is provided so as to be slidable in a sideways direction with respect to the chassis 40 (i.e., in a direction orthogonal to the direction of movement of the disc tray 4). Formed in this cam member 55 are a pair of cam grooves 56a, 56b having roughly the same shape. Each of the cam grooves 56a, 56b is formed from an upper groove 561 and a lower groove 563 which extend in a horizontal direction, respectively, and a slanting groove 562 which connects the upper groove 561 and the lower groove 562.

Formed in the front surface of the base 43 of the mechanism unit 42 are protrusions (driven members) 57a, 57b which are inserted respectively into the cam grooves 56a, 56b. These protrusions 57a, 57b slide along the cam grooves 56a, 56b, whereby they are moved in the up and down direction along the cam grooves. Namely, when the protrusions 57a, 57b are engaged with the upper grooves 561, the front portion of the mechanism unit 42 is at the raised position (ascending position). On the other hand, when the protrusions 57a, 57b are engaged with the lower grooves 563, the front portion of the mechanism unit 42 is at the lowered position (descending position).

Formed in the upper portion of the sector-shaped gear 53 are protrusions 531, 532 which are adapted to be inserted into a first guide groove 4c and a second guide groove 4d formed in the rear surface of the disc tray 4 (see FIG. 6). The protrusion 531 has a circular horizontal cross section, and the protrusion 532 has a semi-circular cross section.

As shown in FIG. 2, the disc tray 4 has a shallow concave disc supporting portion 4a adapted to receive an optical disc 3, whereby the optical disc 3 placed in the disc supporting portion 4a is transported to a prescribed position.

As shown in FIG. 6, a rack gear 4b which meshes with the small gear 525 is formed in the rear surface of the disc tray 4. In this way, by driving the motor 51, it is possible to move the disc tray 4 in a forward and backward direction with respect to the chassis 40 between a disc loaded position in which the optical disc 3 is loaded (can be played back) and a disc ejection position in which the optical disc 3 is ejected (can be removed). Thus, when a disc loading operation is carried out to load the optical disc 3, the small gear 525 rotates clockwise in the condition as shown in FIG. 3, and this causes the disc tray 4 to move backwards, whereby the optical disc 3 is transported into the inside of the main body 2.

Further, as stated above, the first guide groove 4c and the second guide groove 4d are formed in the rear surface of the disc tray 4. The first guide groove 4c is formed roughly parallel with the rack gear 4b, and at the front of the disc tray 4 (the lower portion of FIG. 6), this guide groove 4c slants so as to approach the rack gear 4b. Further, the second guide groove 4d is bent in a prescribed way. The protrusions 531 and 532 of the sector-shaped gear 53 are adapted to be inserted into the first guide groove 4c and second guide groove 4d, respectively. These guide grooves 4c and 4d regulates or controls the displacements of the protrusions 531, 532, that is the movement of the sector-shaped gear 53 to follow the movement of the disc tray 4.

The disc damper 8 is provided on an upper portion of the chassis 40. This disc damper 8 is rotatably supported by the plate-shaped disc damper supporting member 80.

The disc damper supporting member 80 is fastened at both ends thereof with screws (or rivets) to the attaching portions 40c, 40c of the chassis 40, whereby the disc damper supporting member 80 is arranged along the sideways direction in the upper portion of the chassis 40. A circular aperture is formed in a roughly central portion of the support member 80.

In more details, the disc damper 8 is composed of a flange portion which is engageable with the upper surface of the supporting member 80 and a cylindrical portion integrally formed with the flange portion and rotatably positioned within the aperture so as to protrude toward to the turntable 46. The disc damper 8 is constructed from or includes a material (preferably a ferromagnetic material) which will be attracted by the permanent magnet housed inside the turntable 46.

As shown in FIG. 2, the casing 10 is constructed from a bottom plate 11, a top plate (second member) 12, and a U-shaped side plate (first member) 13 which is positioned therebetween. The bottom plate 11, top plate 12 and side plate 13 are made by carrying out a press working process (e.g., shearing, punching, bending, etc.) or the like on metal plates to form predetermined shapes.

The casing 10 is assembled by fixing the bottom plate 11 to the side plate 13 and the top plate 12 to the side plate 13 by means of fasteners such as screws or the like.

A front portion of the top plate 12 is bent by roughly 90 degrees to form a front plate 121. A horizontally elongated narrow aperture 122 is formed in the front plate 121 to allow the disc tray 4 to pass therethrough. Further, a small hole 123 is formed in a roughly central portion of the front plate 121 to allow a pin member (not shown in the drawings) for operating an emergency eject mechanism 60 (described below) to pass therethrough.

Further, the front panel 16 is attached to the front plate 121 via a frame-shaped cushion member 15 made of a cushioning material such as sponge or the like. A horizontally elongated narrow aperture 16a is also formed in the front panel 16 to allow the disc tray 4 to pass therethrough. Further, a small hole 16b is formed in a roughly central portion of the front panel 16 so as to correspond to the hole 123 of the front plate 121 described above, thereby allowing a pin member (not shown in the drawings) for operating the emergency eject mechanism 60 (described below) to pass therethrough.

As shown in FIG. 9, the side plate 13 is a U-shaped side wall portion integrally formed from a first side wall 13a and second side wall 13b which face each other through the main body 2, and a third side wall 13c which joins the first and second side walls 13a, 13b at the vertical rear edges thereof.

Protrusions 131 are integrally formed at a plurality of locations on the upper edge of the side plate 13, namely, on the edge portion which makes contact with the top plate 12. In more details, at least two protrusions 131, 131 are integrally formed on the upper edge of each of the first, second and third side walls 13a, 13b, 13c, respectively.

As shown in FIG. 9, in the present embodiment, a tip portion of each of the protrusions 131 is formed into a rounded shape. It is also possible for the tip portions of the protrusions 131 to be flat or pointed, but the rounded shape is preferred because it is safe and make it possible to obtain point contact with the top plate 12.

When the side plate 13 and the top plate 12 are connected, the side plate 13 is in point contact with the inner surface (rear surface) of the top plate 12 through each of the protrusions 131. That is, the top plate 12 is in contact with the side plate 12 through a very small surface area. In this way, it is possible to create a stable connection between the side plate 13 and the top plate 12, thereby preventing rattling and making it possible to easily assemble the casing 10 (including positioning between the side plate 13 and the top plate 12).

Further, bottom plate mounting portions 134 are formed on the lower edge of the side plate 13 to enable the side plate 13 to be fastened to the bottom plate 11 with screws or the like. Furthermore, top plate mounting portions 135 are formed on the upper edge of the side plate 13 to enable the side plate 13 to be fastened to the top plate 13 with screws or the like. In this case, one top plate mounting portion 135 is provided between the pair of protrusions 131 in each of the first, second and third side walls 13a, 13b, 13c. Although a stress due to the screw fasteners is likely to be concentrated in the vicinity of the mounting portions 135 for the top plate 12, it is possible to obtain an even more stable connection between the side plate 13 and the top plate 12 and then maintain the connection by setting the positional relationship between each of the protrusions 131 and mounting portions 135 in this way.

Furthermore, a manufacturing process can be made easy because it is possible to use a press working operation or the like to integrally form the protrusions 131 and mounting portions 134, 135 at the same time the side plate 13 is being made.

In the present invention, these kind of protrusions 131 may also be formed in the lower edge of the side plate, namely, on the edges which are in contact with the bottom plate 11. In this case, the locations of the protrusions 131 and the number of the protrusions 131 as well as the positional relationship with respect to the mounting portions 134 may be the same as those of the above described case where the protrusions 131 are formed on the upper edges of the side plate 13.

The main body 2 having the above structure is supported by the casing 10 through a plurality of vibration absorbing members (vibration damping members) 7 at the side portions of the main body 2. Hereinbelow, detailed description is made with regard to this supporting structure of the main body 2 with respect to the casing 10.

As shown in FIG. 2 and FIG. 9, a pair of vibration absorbing member mounting portions 132 are integrally formed on each of the inner surfaces of the side plate 13 which face with each other. Each of the mounting portions 132 is constructed from a plate-like member which has been bent into an L-shape, in which an aperture 133 is formed in the central portion thereof. Further, as stated in the above, the side plate 13 is integrally formed with the bottom plate mounting portions 134 to which the bottom plate 11 is mounted via screws and the top plate mounting portions 135 to which the top plate 12 is mounted via screws. These mounting portions 134 and 135 are provided at predetermined portions.

Further, as shown in FIG. 5, vibration absorbing member mounting portions 40d are provided on the left and right wall portions 40b of the chassis 40 for mounting vibration absorbing members 7, respectively, at positions which correspond to the mounting portions 132 of the side plate 13. Each of the mounting portions 40d is constructed from a concave portion 49, and each concave portion has a bottom portion 491 in which an aperture 492 which is the same as the aperture 133 is formed.

As shown in FIG. 10, each of the vibration absorbing members 7 includes flange-shaped first and second engaging portions 71, 72 which are located at the opposite ends of the vibration absorbing member 7, and a deformable portion 73 which is positioned between the first and second engaging portions 71 and 71. The deformable portion 73 is formed of a thin material so as to be elastically deformed. With this result, a reduced radial portion 74 is formed between the first engaging portion 71 and the deformable portion 73, and a reduced radial portion 75 is formed between the second engaging portion 72 and the deformable portion 73, respectively. Further, each of the vibration absorbing members 7 includes a hollow space or opening 76 which is formed so as to pass the vibration absorbing members 7 along the axial direction thereof (the horizontal direction in FIG. 9).

Each of the vibration absorbing members 7 may be formed of an elastic material such as various rubbers, soft resins (thermoplastic elastomers) or the like, such that by elastical deformation of the deformable portion 73, it is possible for the vibration absorbing member to expand or contract in at least the axial direction thereof, namely, in the direction in which vibrations are generated by eccentric rotation of the optical disc 3 (i.e., the horizontal direction).

In addition, the vibration absorbing member 7 is deformable in the direction of vibrations which are generated in rotational axis of the optical disc 3 (i.e., the vertical direction).

As is well illustrated in FIG. 5, each of the deformable portions 73 is housed within the respective concave portion 49 formed in the wall portion 40b of the chassis 40, in which the reduced diameter portion 74 is inserted into the aperture 492 of the mounting portion of 40d of the chassis 40, while the other reduced diameter portion 75 is inserted into the aperture 133 of the corresponding supporting mounting 132 of the side plate 132 of the casing 10 (see FIG. 9). As a result, the first engaging portion 71 is engaged with the bottom portion 491 of the mounting portion 40d of the chassis 40, and the second engaging portion 72 is engaged with the mounting portion 132 of the casing.

In this way, the main body 2 is supported with respect to the inside of the side plate 13 of the casing 10 by means of a plurality of vibration absorbing members 7 provided between the left and right wall portions 40b of the chassis 40 and the opposite inside of the side plate 13 of the casing 10. Consequently, even if a vibration is generated in the mechanism unit 42 and therefore in the main body 2 due to eccentric rotation of the optical disc 3, for example, such vibration is absorbed or damped by the vibration absorbing members 7, thereby suppressing the transmission of vibrations to the casing 10. As a result, it is possible to prevent a noise is generated at the casing 10 due to a resonant vibration of the casing or the like.

Further, in order to obtain even more effective vibration suppressing effects, it is preferred that the main body 2 is in contact with the casing 10 (particularly the side plate 13) only through the vibration absorbing members 7. However, it is of course possible for a part of the main body 2 to be in direct or indirect contact with the casing 10.

As stated in the foregoing, the vibration absorbing members 7 each having the above-described structure exhibit excellent vibration absorbing or damping effects, especially a vibration absorbing effect in the horizontal direction. Further, since the vibration absorbing member is flexible, attachment or removable thereof can be made easily. In this connection, it goes without saying that the shape, structure, mounting position or number of the vibration absorbing members 7 are not limited to those shown in the drawings.

Further, because each of the vibration absorbing members 7 can be attached only by fitting the opposite end portions thereof into the mounting portion 40d of the chassis 40 and the mounting portion 132 of the side plate 13, respectively, no separate or additional element is required to attach the vibration absorbing members 7. Consequently, the vibration absorbing members 7 can be attached very easily, thereby enabling to reduce the number of parts required.

Further, because the main body 2 is supported by the side plate 13 by means of the vibration absorbing members 7 provided on the left and right side portions of the chassis 40, it is possible to achieve the above-described excellent vibration suppressing effects, regardless of the posture of the disc drive 1A. Namely, in a case where the disc drive 1A is installed horizontally in a horizontally placed type computer body, it is still possible to exhibit vibration absorbing effect described above even if the computer is used by placing the computer body vertically, that is the disc drive 1A is used in a vertical posture. Further, although not shown in the drawings, it is possible to provide additional vibration absorbing member between the third side wall 13c of the side plate 13 and the back surface of the chassis 40.

Furthermore, in the present embodiment, in order to form the vibration absorbing member mounting portions 132 which are formed by bending plate-like members extending from the side plate 13 to a predetermined shape, the side plate 13 and the bottom plate 11 are constructed from separate members. However, it is also possible to join or integrally form the side plate 13 and the bottom plate 11 together. In this case, the mounting portions 132 for the vibration absorbing members 7 may be erected from the bottom plate 11.

Now, the disc drive 1A of the present embodiment is further equipped with an emergency eject mechanism 60. This emergency eject mechanism makes it possible to eject the optical disc 3 by manually moving the disc tray 4 forward at the time when a power outage were to occur, for example, while the disc drive 1A is playing back an optical disc 3.

As is best shown in FIG. 5, the emergency eject mechanism 60 is constructed from an arc-shaped slot 61 formed in the front portion of the chassis 40, a protrusion 62 which is formed so as to protrude from the rear surface (lower surface) of the sector-shaped gear 53 into the slot 61 so as to move along the slot 61, a pushing member 63 which pushes the protrusion 62 and rotates the sector-shaped gear 53 in a counter-clockwise direction as viewed in FIG. 3, and a spring 65 which biases the pushing member 63 toward the front (as seen in the lower part of FIG. 5). Further, an elongated slot 64 is formed in the pushing member 63, and inserted into this slot 64 is a pin 66 which is erected from the chassis 40. In this way, the pushing member 63 can move forwards and backwards.

Next, the operation of the disc drive 1A will be described.

When the disc drive 1A is not in use, the empty disc tray 4 is kept in a housed state (at the disc loaded position) within the casing 10 (i.e., within the main body 2) (see FIG. 4).

In this state, if an eject operation is carried out, the motor 51 is rotated in a prescribed direction, and this causes the small gear 525 to rotate, via the rotational speed reduction mechanism 52, in a counter-clockwise direction. Now, because the small gear 525 meshes with the rack gear 4b of the rear surface of the disc tray 4, the rotation of the small gear 525 causes the disc tray 4 to move forward out through the apertures 121, 16a to a protruding position (i.e., a disc unloading position) outside the casing 10.

At the same time, the protrusions 57a, 57b (see FIG. 8) which are positioned in the upper grooves 561 of the cam grooves 56a, 56b are moved into the lower grooves 563 via the slanting grooves 562 (see FIG. 7). In this way, the mechanism unit 42 is caused to pivot about the axles 431, 432, whereby the front portion of the mechanism unit 42 is lowered (displaced) from an upper position to a lower position. Further, the turntable 46 which is mounted on the mechanism unit 42 is also moved to a lower position, where the turntable 46 is positioned at a prescribed spacing from the disc damper 8.

Then, if an optical disc 3 is placed into the disc supporting portion 4a of the disc tray 4 and a loading operation is carried out, the motor 51 is caused to rotate in the reverse direction. As a result, the rotational speed reduction mechanism 52 transmits reduced rotational speed to the small gear 525, thereby causing the small gear 525 to rotate in the clockwise direction (i.e., reverse rotation) as shown in FIG. 3. In accordance with this rotation, the disc tray 4 is caused to move backward through the apertures 16a, 122 to the disc loaded position. In this way, the optical disc 3 which is placed at a prescribed position on the disc tray 4 is also transported to the disc loaded position inside the main body 2.

During the loading operation of the disc tray 4, namely, while the disc tray 4 moves backwardly, the protrusion 531 formed on the sector-shaped gear 53 is relatively moved along the first guide groove 4c formed in the rear surface of the disc tray 4. In this case, since the position (posture) of the sector-shaped gear 53 is regulated by the engagement between the protrusion 531 and the guide groove 4c, the sector-shaped gear 53 is being kept at a prescribed positioned shown in FIG. 3 where the sector-shaped gear 53 does not mesh with the small gear 525. As a result, the cam member 55 is not moved, and the front portion of the mechanism unit 42 is kept in the lower position.

When the disc tray 4 approaches the loaded position, the protrusion 532 formed on the sector-shaped gear 53 is inserted into the second guide groove 4d from the insertion portion 4e, whereby the groove 4d guides the sector-shaped gear 53 to rotate in a counter-clockwise direction from the position shown in FIG. 3. At the same time, the protrusion 531 is moved toward the rack gear 4b in the vicinity of the front portion of the first guide groove 4c. As a result, the sector-shaped gear 53 meshes with the small gear 525, so that the rotational force transmitted from the small gear 525 causing the sector-shaped gear 53 to rotate in a counter-clockwise direction indicated by the arrow in FIG. 4.

The rotation of the sector-shaped gear 53 moves the rack gear 54 and the cam member 55 to the right direction in FIG. 7 (left direction in FIG. 3), and this moves the protrusions 57a, 57b from their positions in the lower grooves 563 of the cam grooves 56a, 56b (see FIG. 7) to the upper grooves 561 along the slanting grooves 562 (see FIG. 8). In this way, the mechanism unit 42 is pivoted about the axles 431, 432 to raise (displace) the front portion of the mechanism unit 42 from the lower position to the upper position, where the mechanism unit 42 is placed in a roughly horizontal state.

The displacement of the mechanism unit 42 causes the center hub portion 46a of the turntable 46 to fit into the center hole 3a of the optical disc 3. Then, while the turntable 46 supports the center portion of the optical disc 3, the permanent magnet housed inside the turntable 46 attracts the disc damper 8, whereby the optical disc 3 is securely held between the turntable 46 and the rotator 81.

Once the optical disc 3 has been loaded into the loaded position as described above, the spindle motor 45 is operated to rotate the optical disc 3 held between the turntable 46 and the disc damper 8 at a prescribed rotational speed.

Next, the optical head moving mechanism 48 moves the optical head 47 to a prescribed position with respect to the radial direction of the optical disc 3. Then, while carrying out tracking control and focusing control, beam is emitted toward the recording surface of the optical disc 3, with the reflected beam therefrom being collected to playback the information recorded on the optical disc 3.

When playing back the information recorded on the disc 3 in this way, there is a case that vibrations would occur in the mechanism unit 42 due to eccentric rotation of the optical disc 3 which is likely to be caused by dimensional errors in the optical disc 3 or misalignment with the center of the optical disc 3 or the like. In this regard, such vibrations become increasing severe as the rotational speed of the optical disc 3 is increased. However, in the disc drive 1A of the present invention, such vibrations caused in the mechanism unit 42 are absorbed by the vibration damping member 5 and the vibration absorbing members 7, thereby preventing or suppressing the transmission of such vibrations to the casing 10.

In particular, because eccentric rotation of the optical disc 3 mainly generates a horizontally directed vibration in the mechanism unit 42 and chassis 40, the flexibility of the vibration absorbing members 7 in that same direction makes it possible to effectively absorb and damp such vibrations, whereby a highly effective vibration damping is achieved.

Furthermore, even in the case where some vibrations that are not absorbed by the vibration absorbing members 5, 7 are transmitted to the casing 10, very little noise will be generated because the point contact connection between the side plate 13 and the inner surface of the top plate 12 by means of the protrusions 131 creates a stable connection or coupling therebetween which prevents rattling.

If the playing back operation is stopped and an eject operation is carried out, the operations of each of the mechanisms of the disk drive 1A carried out in the eject operation described above are carried out again, whereby the disc 3 is released from its clamped state between the turntable 46 and the disc damper 8 and ejected to the outside together with the disc tray 4.

Further, in the case where the rotation of the optical disc 3 is stopped, such as when a power outage occurs during play back, the emergency eject mechanism 60 can be operated to manually move the disc tray 4 forwards to enable the optical disc 3 to be removed therefrom.

Namely, when the disc tray 4 is in the disc loaded position, a pin member (not shown in the drawings) is inserted through the holes 16b and 123 formed in the front panel 16 and the front plate 121 to push the pushing member 63, thereby moving the pushing member 63 backwardly. In this way, a curved pushing surface 631 of the pushing member 63 pushes the protrusion 62, which causes the protrusion 62 to move along the slot 61, whereby the sector-shaped gear 53 is rotated in a clockwise direction from the position shown in FIG. 4. As a result, the small gear 525 which meshes with the sector-shaped gear 53 is caused to rotate in a clockwise direction in FIG. 4, and this in turn causes the rack gear which meshes with the small gear 525 to move forward, whereby the disc tray 4 is forced to move forward and protrude to the outside through the aperture 16a.

After this is done, the protruding portion of the disc tray 4 can be grasped with the fingers and the disc tray 4 can then be pulled to the outside to enable the optical disc 3 to be removed from the disc tray 4.

After the disk tray 4 has been manually ejected in this way, the pin member can be removed from the holes 16b and 123, whereupon the biasing force of the spring 65 returns the pushing member 63 to its original position as shown in FIG. 5.

At this point it is to be noted that even though the present invention was described above with reference to the embodiments shown in the drawings, the present invention is not limited to these embodiments, and instead it is possible to construct many types of structures so long as they are capable of performing the same kind of functions.

For example, the vibration absorbing members 7 are not limited to the structure shown in the drawings. They may be constructed from other structure or materials in so far as exhibiting a vibration-absorbing, vibration-damping or noise-suppressing capability as described above. Examples of such alternatives may include elastic members having no hollow spaces, various sponge-like materials (porous materials), various springs such as coil springs, plate springs and the like, oil dampers, air dampers, viscous or viscoelastic materials, or any combination thereof.

Further, the number, positions, shapes of the protrusions 131 formed on the side plate 13 are not limited to the structure shown in the drawings.

As described above, according to the present invention, since the main body is supported with respect to the casing by means of a plurality of vibration absorbing members, it is possible to suppress vibrations caused by eccentric rotation of an optical disc or the like from being transmitted to the casing, thereby enabling to suppress generation of noise.

In particular, since the vibration absorbing members are arranged on the side portions of the main body, this arrangement exhibits a vibration damping or absorbing effect especially for vibrations in the direction of the radial direction of the optical disc which is likely to be caused by the eccentric rotation of the optical disk. Further, this vibration damping or absorbing effect is exhibited regardless of the posture of the disc drive, that is in a horizontal posture or a vertical posture.

Further, according to the present invention, since the vibration absorbing members are arranged on the side portions of the main body, it becomes possible to utilize upper or lower space of the main body. Further, the number of parts is not increased in comparison with the prior art. Furthermore, attachment or removal of the vibration absorbing members and assembly of the disc drive can be carried out easily.

For these reasons, this invention is particularly suitable for disc drives in which an optical disc is rotated with a high rotational speed and therefore vibrations are likely to be generated.

In addition, as described above, by forming a plurality of protrusions 131 on a first member (side plate) which makes contact with a second member (top plate or bottom plate) to form a casing 10, it is possible to establish point contact between the first and second members, and this makes it possible to create a stable connection between the first and second members when they are joined together with screws. Consequently, even if vibrations are generated due to eccentric rotation of a disc, it is possible to suppress the generation of rattling and noise in the casing.

Further, by setting the shape, number and position of the protrusions appropriately, in particular, by setting a positional relationship between the mounting portions for fixing the second member and the respective protrusions appropriately as described above, it is possible to achieve remarkable effects.

Consequently, the present invention is suited for high speed rotation of discs where vibration and noise are very likely to be generated.

Further, because the members which make up the casing in the present invention do not require a high processing accuracy (dimensional accuracy), the parts of the casing are easy to manufacture, and assemble thereof, in particular positioning between the first and second members can be carried out easily.

Furthermore, it is to be noted that the present invention is applied to other disc drives such as CD-R drive, CD-RW drive and DVD-drive and the like. In particular, the present invention is suitable for disc drives which are installed in personal computers.

Finally, it is also to be noted that various modifications or changes can be made without departing from the split of the present invention, and the scope of the present invention is determined only by the following claims.

What is claimed is:

1. An optical disc drive for playing back or playing back and recording an optical disc, the disc drive comprising:
   a main body which includes a mechanism unit having a disc rotating means for rotating the optical disc and a play back means for at least playing back information recorded on the optical disc, the main body having side portions;
   a casing for housing the main body, the casing including a side plate and a top plate which is removably fixed to the side plate, said side plate having side walls which partially surround the side portions of the main body, each side wall of the side plate having an upper edge, said side plate and said top plate being formed of a metal plate;
   a plurality of protrusions integrally formed on the upper edges of the side walls of the side plate so that the top plate is in contact with the side plate through the protrusions to establish point contact between the side plate and the top plate; and
   means for fastening the top plate to the side plate.

2. The disc drive as claimed in claim 1 wherein the side walls of the side plate include first and second side walls which face each other through the main body and a third side wall which loins the first and second side walls wherein at least one protrusion of said plurality of protrusions is formed on the upper edge of each of the first, second and third side walls.

3. The disc drive as claimed in claim 1 wherein the side walls of the side plate include first and second side walls which face each other through the main body and a third side wall which loins the first and second side walls wherein at least two protrusions of said plurality of protrusions are formed on the upper edge of each of the first and second side walls.

4. The disc drive as claimed in claim 3 wherein the side plate includes mounting portions provided between the protrusions formed on the first side wall and between the protrusions formed on the second side walls, respectively, for screw fastening the top plate to the side plate.

5. The disc drive as claimed in claim 1 wherein the protrusions are formed with rounded tip end portions.

6. The disc drive as claimed in claim 1 further comprising a plurality of vibration absorbing means provided between the inside of the side plate and the side portions of the main body to prevent vibrations caused by rotation of the disc from being transmitted to the casing from the main body.

7. The disc drive as claimed in claim 6 wherein the main body is supported by the side plate via the vibration absorbing means.

8. The disc drive as claimed in claim 7 wherein the side walls of the side plate include first and second side walls which face each other through the main body and a third side wall which joins the first and second side walls, wherein the vibration absorbing means are provided between the side portion of the main body and the inside of the first side wall of the side plate and between the opposite side portion of the main body and the inside of the second side wall of the side plate, respectively.

9. The disc drive as claimed in claim 8 wherein each of the side portions of the main body is supported on the inside of each of the first and second side walls at at least two locations via the vibration absorbing means.

10. The disc drive as claimed in claim 9 wherein the main body is in contact with the casing only through the vibration absorbing means.

11. The disc drive as claimed in claim 7 wherein each of the vibration absorbing means is comprised of an elastic material having a hollow axial space.

12. The disc drive as claimed in claim 11 wherein the vibration absorbing means is flexible in the direction of vibration generated in the direction of the rotation axis of the disc.

13. The disc drive as claimed in claim 12 wherein the vibration absorbing means is deformable in the direction of vibration generated in the direction of the rotation axis of the disc.

14. The disc drive as claimed in claim 13 wherein each of the vibration absorbing means comprises a first engaging portion mounted on the side portion of the main body and a second engaging portion mounted on respective ones of the side walls of the side plate of the casing, and a deformable portion which is capable of elastic deformation and which is provided between the first and second engaging portions.

15. An optical disc drive for playing back or playing back and recording an optical disc, the disc drive comprising:
   a main body which includes a mechanism unit having an optical disc rotating means for rotating the optical disc and a play back means for at least playing back information recorded on the optical disc, the main body having side portions;
   a casing for housing the main body, the casing including a side plate and a top plate which is removably fixed to the side plate, said side plate having side walls which partially surround the side portions of the main body, said side walls including first and second side walls which face each other through the main body and a third side wall which joins the first and second side walls wherein each of the side walls of the side plate has an upper edge and wherein said side plate and said top plate being formed of a metal plate;
   at least two protrusions integrally formed at least on the upper edges of the first and second side walls of the side plate so that the top plate is in contact with the side plate through the protrusions to establish point contact between the side plate and the top plate; and
   means for fastening the top plate to the side plate, said fastening means including mounting portions provided at least between the protrusions formed on the first side wall and between the protrusions formed on the second side wall, respectively, for screw fastening the top plate to the side plate.

* * * * *